Figure 1:
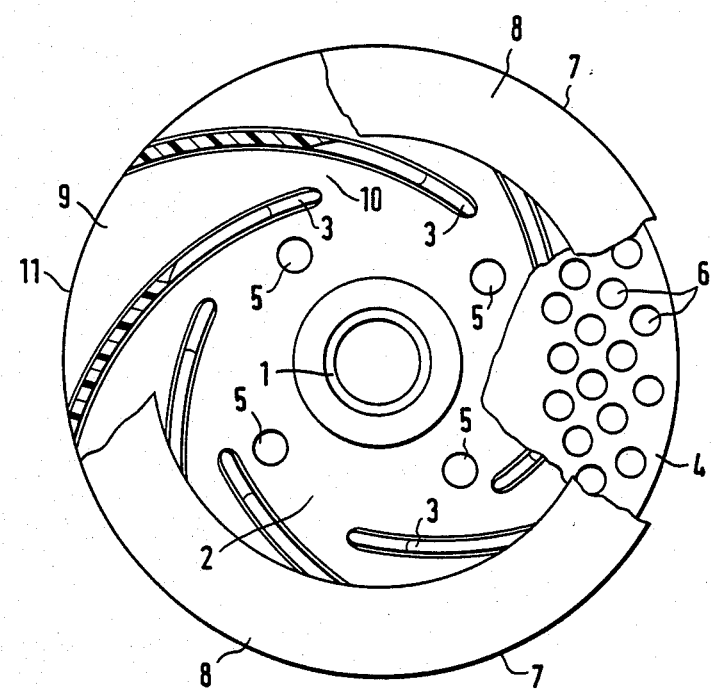

United States Patent [19]

Friedrichs

[11] Patent Number: 4,827,589
[45] Date of Patent: May 9, 1989

[54] METHOD FOR THE MANUFACTURE OF A PUMP ROTOR FOR A COOLANT PUMP IN A MOTOR VEHICLE

[75] Inventor: K. Gerd Friedrichs, Leverkusen, Fed. Rep. of Germany

[73] Assignee: Klifa Fahrzeugteile GmbH & Co., Mannheim, Fed. Rep. of Germany

[21] Appl. No.: 99,887

[22] Filed: Sep. 22, 1987

[30] Foreign Application Priority Data

Sep. 23, 1986 [DE] Fed. Rep. of Germany ....... 3632259

[51] Int. Cl.$^4$ .............................................. B23P 15/00
[52] U.S. Cl. ......................... 29/156.4 R; 29/156.8 R; 29/527.3
[58] Field of Search ................. 29/156.4, 527.1, 527.3, 29/527.4, 156.8 R, 530; 264/317, 273, 274, 275, 278

[56] References Cited

U.S. PATENT DOCUMENTS

| | | | |
|---|---|---|---|
| 3,670,071 | 6/1972 | Walchle et al. | 264/273 |
| 3,920,360 | 1/1975 | Bierlun | 29/527.3 |
| 3,981,688 | 9/1976 | Telarg et al. | 29/527.3 |
| 4,243,362 | 1/1981 | Rees et al. | 264/273 |
| 4,470,784 | 9/1984 | Piotrousky | 264/278 |
| 4,556,528 | 12/1985 | Gusch et al. | 264/317 |
| 4,576,770 | 3/1986 | Schultz | 264/317 |
| 4,692,099 | 9/1987 | Homia et al. | 29/156.4 R |
| 4,743,481 | 5/1988 | Quinlan et al. | 264/317 |

Primary Examiner—Howard N. Goldberg
Assistant Examiner—Irene Cuda
Attorney, Agent, or Firm—Fleit, Jacobson, Cohn & Price

[57] ABSTRACT

A method for the manufacture of a closed plastic pump rotor is described. The mold comprises two outer casting mold shells and an intermediate core, whose shaping determines the shape of the guide vanes and flow channels of the rotor. The core is made from a material, whose melting point is below that of the plastic to be cast. The core is melted following the curing of the plastic.

14 Claims, 2 Drawing Sheets

METHOD FOR THE MANUFACTURE OF A PUMP ROTOR FOR A COOLANT PUMP IN A MOTOR VEHICLE The present invention relates to a method for the manufacture of a rotor for a coolant pump in a motor vehicle, for example a water pump rotor for a cooling water pump or a fan rotor, the rotor having a metal hub for mounting on a shaft, a metal reinforcing disk coaxially shaped on to one end of the metal hub and surrounded by plastic and guide vanes shaped from plastic located in the outer circumferential area of the pump rotor.

Pump rotors or impellers of the aforementioned type are fundamentally known in connection with their use in internal combustion engines. Due to the thermal loads which can occur in this particular use, where there can be temperatures ranging from approximately −40° C. to +130° C., special demands are made on the materials and the construction. The use of grey cast-iron or brass for such a pump rotor has the disadvantage that such materials have a cavitation tendency leading to the destruction of the rotor. Apart from the high weight and high costs, the further disadvantage arises that the surface is rough, so that the flow resistance is increased.

In addition, water pumps are known, in which the water pump rotor is completely made from plastic. However, due to the high hot and cold loads, this construction is not suitable for motor vehicles, because the rotors bend in such a way that they run up against the casing wall. It has also not hitherto been possible to manufacture closed pump wheels from plastic.

Furthermore, U.S. Pat. No. 3,251,307 discloses an open water pump rotor for use in connection with internal combustion engines, which has a metal hub and a metal reinforcing disk oriented substantially at right angles to the hub axis and coaxially shaped on to the hub. Together with the outer surface of the hub, the reinforcing disk is embedded in a plastic body. Here again, during the operation of the rotor, a deflection is unavoidable due to the resultant axial force. The axial thrust produced leads to the risk of the rotor being destroyed on the casing. If for safety reasons large spaces are provided, the efficiency of the rotor or pump is correspondingly low.

The problem of the present invention is to provide a method for the manufacture of a rotor of the aforementioned type, in which the disadvantageous effects of axial forces are reduced.

This problem is solved by arranging the reinforcing disk is arranged in a first casting mold shell, whose shaped out parts define that surface of the rotor opposite to the flow channels of said rotor. A core is placed over the reinforcing disk and the shaping thereof defines the shape of the rotor blades and the flow channels. The first casting mold shell and the core are tightly sealed in the outer circumferential region thereof. The core is made from a material, whose melting point is below that of the plastic to be cast. A second casting mold shell is mounted on the core and in its outer circumferential region and on the openings of the flow channels issuing in the axial direction is tightly sealed with the core. The second casting mold shell is constructed for forming a cover located over the flow channels. The cavities formed between the first and second casting mold shells and the core are then filled with plastic, and finally the core is melted.

The invention has the advantage that now also closed pump rotors or impellers can be made from a plastics material. Through the melting of the core, it is possible to manufacture the cavities of a closed pump rotor.

According to a preferred development of the invention, on either side of the reinforcing disk are provided stampings, whose height corresponds to the thickness of the plastic subsequently to be applied. These stampings permit a dimensionally accurate arrangement of the reinforcing disk relative to the first casting mold shell and to the core, because during the casting of the plastic, the two moldings are supported on the stampings and maintained with the desired spacing.

It is particularly advantageous to produce the stampings by stamping out circular openings and deep drawing the opening rims. It is alternatively possible to produce the stampings by stamping out and bending tongues.

It is also advantageous to widen the free end of the hub. This offers the advantage that the pump rotor can be mounted without difficulty on a driving shaft, because the widening acts in the manner of a funnel.

It is also advantageous to provide the reinforcing disk with at least one adjusting opening and to pass therethrough an adjusting mandrel located in the core and/or the first mold shell. This makes it possible to increase the dimensional accuracy of the pump rotor. If the mandrel leads to an opening in the pump rotor, this can be useful for compensating the axial thrust.

According to another preferred embodiment, prior to casting, a metal ring is mounted on the hub and cast in the plastic. This ring reinforces the hub, so that it is possible to absorb powerful stresses caused by heat action. It also makes it possible to compensate any material fatigue which occurs.

Both for the casting process and for the adhesive action of the plastic, it is advantageous to provide the reinforcing disk with a plurality of openings, which permit the penetration of plastic.

It is advantageous to stagger the openings in the circumferential direction. As a result the supporting effect of the reinforcing disk is maintained and the plastic can be uniformly distributed within the mold cavity.

The assembly and adjustment of the two casting mold shells is facilitated in that the hub is mounted on a shaft during casting. The shaft can form the boundary of the mold cavity in the extension of the hub.

It can be advantageous for the shaft to extend up to the hub and to engage a pin in the latter. The differing external diameters of shaft and pin ensure that the plastic extending axially over the hub has in the radial direction a predetermined spacing from the driving shaft which, on inserting the pump rotor, is engaged in dimensionally accurate manner in the hub. This ensures that the different expansion coefficients of the metal hub and the plastic parts do not have disadvantageous effects and cannot damage the pump rotor.

Further developments of the invention and preferred materials for the core are given in the subclaims.

The invention is described in greater detail hereinafter relative to non-limitative embodiments and the attached drawings, wherein show:

FIG. 1- Diagrammatically a plan view of a partly cut away pump rotor.

Figure 2:
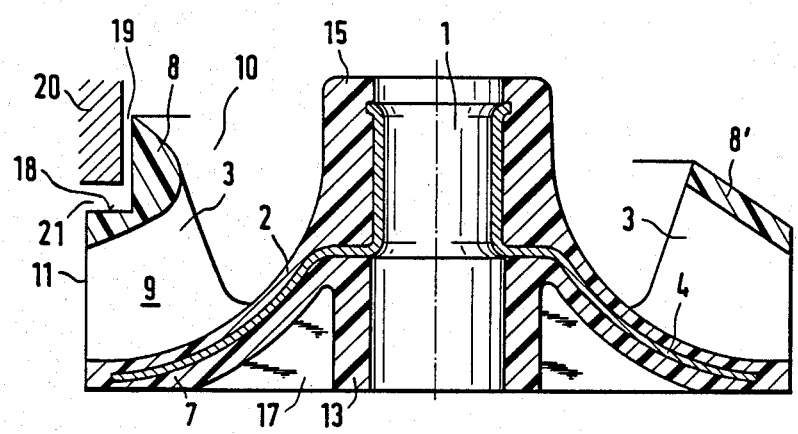

FIG. 2- Diagrammatically a cross-section through two examples of a pump rotor according to FIG. 1.

Figure 3:
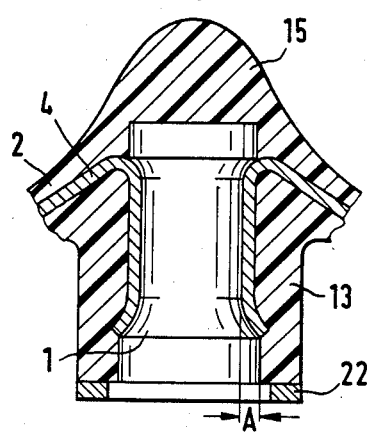
Figure 4:
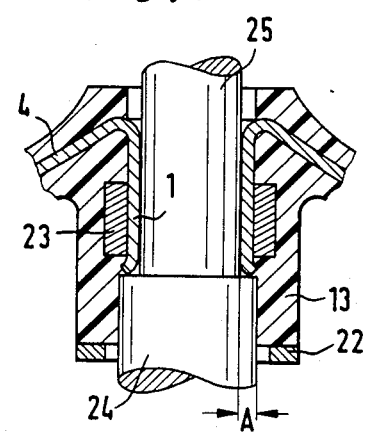

FIGS. 3 and 4- Diagrammatically in each case a cross-section through a detail of a pump rotor.

Figure 5:
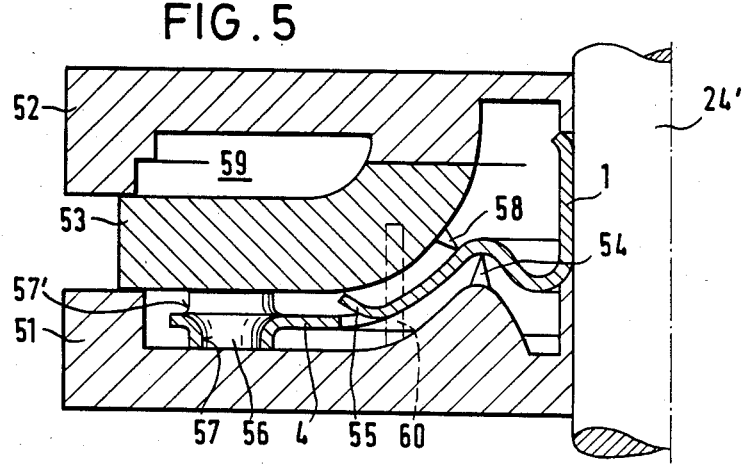
Figure 6:
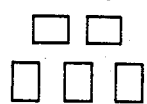
Figure 7:
Figure 8:
Figure 9:
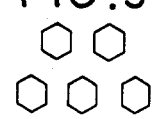
Figure 10:
Figure 11:
Figure 12:
Figure 13:
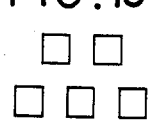

FIG. 5- Diagrammatically a cross-section through a casting mold for a pump rotor.

FIGS. 6 to 13- Diagrammatically in each case examples for a perforation of a reinforcing disk in a pump rotor.

A first embodiment of a pump rotor or impeller shown in FIG. 1 comprises a hub 1, by means of which the pump rotor is mounted on a not shown driving shaft. A coaxially arranged, circular disk part 7, on which are shaped guide vanes 3, which is at right angles to the hub axis is connected to the hub by means of a revolution-paraboloid reinforcing region 2. Guide vanes 3 may also be referred to as rotor blades. Reinforcing region 2 and disk part 7 together form a reinforcing disk 4, which is sprayed with plastic on either side and passes into hub 1. Plastic is only applied on one side to the outer surface of hub 1, so that the pump rotor with its metal inner surface of hub 1 can be mounted on the driving shaft.

For better anchoring of the plastic with reinforcing disk 4, openings 6 are distributed over the surface of reinforcing disk 4. Said openings 6 can cover roughly 40 to 70% of the surface of reinforcing disk 4. As is illustrated by a partial section through the pump rotor, the openings 6 are circular in the presently represented embodiment. Other shapes of openings 6 are described in FIGS. 6 to 13. In the present embodiment there are also four adjusting openings 5, which are parallel to the hub axis and whose significance will be explained relative to FIG. 5. Hub 1 of reinforcing disk 4 extends over at least 40% of the hub length of the pump rotor. Disk part 7 is only slightly smaller than the external diameter of the water pump rotor, so that the guide vanes 3 are located entirely in the vicinity of reinforcing disk 4.

In the outer circumferential region of the rotor, the flow channels 9 between the guide vanes 3 are closed at the top by a cover 8, so that a closed rotor with a rotor intake 10 running roughly parallel to the hub axis and rotor outlets 11 directed radially outwards is formed. In the left-hand, upper part of FIG. 1, a partial section illustrates in exemplified manner the path of a flow channel 9 with rotor intake 10 and rotor outlet 11.

In the cross-section through a pump rotor according to FIG. 2, different cross-sections for covers 8, 8' are provided on the left and right-hand sides for illustrating two different rotors. Unlike in the presently chosen representation, the cover 8, 8' for a rotor has an all-round identical construction. It can also be gathered that plastic parts 13, 15 in the axial direction of the hub are shaped over and beyond the metal hub 1. These two plastic parts 13, 15 terminate in the radial direction at a given distance from the inner surface of the hub, so as to ensure that the plastic can come into contact with the driving shaft. In the gap between reinforcing region 2 and plastic part 13, in the present embodiment radially directed plastic reinforcing ribs 17 are formed. For embedding reinforcing disk 4 and hub 1 use is made of an abrasion-resistant, stable plastic. On either side, the plastic support typically has a thickness of 1 to 2 mm.

As is illustrated in exemplified manner on the left-hand side of FIG. 2, the cover 8 for flow channel 9 is provided on the outside with an annular groove 18, into which engages a casing 20 in such a way that an axial clearance 19 and a radial clearance 21 remain free, so as not to impede the rotation of the rotor. FIG. 2 clearly shows that an axial thrust of the rotor, which can occur in operation, merely modifies the cross-section of the radial clearance 21, whereas the axial clearance 19 remains cross-sectionally identical. As the axial clearance 19 determines the flow of coolant between casing 20 and the pump rotor, the efficiency of a pump provided with such a closed pump rotor is particularly high, because the axial clearance 19 can be made relatively narrow. FIG. 3 illustrates further details of an embodiment of the pump rotor. Unlike in the embodiment according to FIG. 2, the reinforcing region 2 of the reinforcing disk is at an acute angle to hub 1. The rotor blades are in this embodiment formed on the concave side of the reinforcing disk 4 (not shown).

The free end of hub 1 is widened in a roughly trumpet-shaped manner, in order to facilitate the mounting of the rotor on a driving shaft. The plastic part 13 extended axially over hub 1 terminates at a radial spacing A from the inner surface of the hub. On the front face of the here cylindrically shaped plastic part 13 is mounted a packing ring 22.

In the embodiment according to FIG. 3, on one side hub 1 is sealed by an outwardly streamlined plastic part 15, which is rotationally symmetrical to the hub axis and has the function of preventing vortexing of the coolant upstream of the pump rotor center. Here again, it is obviously necessary to avoid contact between the driving shaft and plastic part 15, so as to prevent the disadvantageous consequences of the different expansion coefficients.

FIG. 4 shows in cross-section another detail of an embodiment of the pump rotor. Unlike in the embodiment according to FIG. 3, the pump rotor additionally has a metal ring 23, which is mounted from the outside on the hub and is cast in the plastic. This supports the hub e.g. against cold flow. Following the mounting of ring 23, as in the embodiment of FIG. 3, the free end of hub 1 can be widened.

FIG. 4 also shows a shaft 24 with a pin 25, but it is not a driving shaft. FIG. 4 merely illustrates the way in which the spacing A can be produced during the actual casting of the pump rotor. During the casting of the rotor, shaft 24 determines the internal diameter of the plastic part, pin 25 being inserted in hub 1. As can be gathered from the description relative to FIG. 5, shaft 24 can also be used for the centering of the casting molds.

FIG. 5 diagrammatically illustrates the way in which the pump rotor can be manufactured. The mold for the pump rotor comprises a first mold shell 51 and a second mold shell 52, as well as an intermediate core 53. In accordance with FIG. 4, a not shown shaft can be used for shaping in the vicinity of hub 1. The first casting mold shell 51 determines the shape and surface of the rotor on the side remote from the guide vanes. In this first shell 51, reinforcing disk 4 is positioned with the aid of spacers, which determine the thickness of the plastic coating.

The spacers can be constructed in different ways. They can e.g. comprise cones 54 or pins, which project from the surface of the first casting mold shell 51. However, it is particularly advantageous for the spacers to be formed by tongues 55, which are stamped from the reinforcing disk 4 and then bent. A particularly preferred possibility consists of making openings 56 in the reinforcing disk 4 and to draw the rims or edges 57 of openings 56 outwards, so that the height of the rims corresponds to the thickness of the plastic to be subsequently poured in. FIG. 5 illustrates in cross-section opening 56 with downwardly drawn edges 57. Only the upwardly drawn rim 57' of a further opening position behind it can be seen.

Spacers can also be formed on core 53 from core material, e.g. in that further cones 58 or the like are constructed. These cones are melted together with the core 53.

Core 53 is arranged on the first mold shell 51 in such a way that it is tightly sealed with the latter in the outer circumferential region. By means of reinforcing disk 4, it is held by the spacers, which in the present embodiment comprise stampings formed by tongue 55 and rim 57', as well as cone 54. Core 53 determines the shape of the flow channels, the rotor intake 10 and the rotor outlets 11 (cf.) FIG. 1). It is made from a material having a melting point below that of the plastic to be cast. The material used for core 53 is a low-melting metal, whose melting point is in the range 50° to 150° C. and is preferably a bismuth alloy.

The second casting mold shell 52 is mounted on the core and through its mold cavity 59 essentially determines the external shape of cover 8. The second mold shell 52 is tightly sealed with core 53. In order to ensure the association of the individual mold components, an adjusting mandrel 60 is provided, which is passed through a not shown adjusting opening in the reinforcing disk 4 and is connected at predetermined points by its ends to the first casting mold shell 51 and core 53. It can also extend up to the second casting mold shell 52. Through the passage of adjusting mandrel 60 through reinforcing disk 4 and through the plastic of the rotor are obtained the through openings in the rotor referred to as "adjusting opening 5" in FIG. 1. The concentric alignment of the first and second shells 51, 52 and reinforcing disk 4 takes place by a shaft 24'.

If the casting mold is arranged in this way, the cavities thereof are filled with an abrasion-resistant, stable plastic. Following the curing of the latter, core 53 is melted away to leave the rotor blades 3 and flow channels 9. This preferably takes place in a bath of liquefied core material.

FIGS. 6 to 13 show various examples for the openings 6 in reinforcing disk 4 and as are diagrammatically shown in FIG. 1. The stampings for producing the spacers can be produced in that the tongues are stamped and bent with the shapes shown in FIGS. 6 to 13 and simultaneously passage openings for the plastic are formed.

When molding plastic, preference is given to an injection molding process, which is known per se and need not therefore be described in detail here.

I claim:

1. A method for the manufacture of a rotor for a coolant pump in a motor vehicle, comprising the steps of:
    providing a metal hub, for mounting on a shaft, having a metal reinforcing disk coaxially shaped on to one end of the metal hub,
    arranging the reinforcing disk in a first casting mold shell,
    defining a surface of the rotor opposite to flow channels to be formed in said rotor by shaped out parts of said first casting mold,
    placing a core made from a material whose melting point is below that of plastic to be cast over the reinforcing disk,
    defining the shape of rotor blades and flow channels to be formed in said rotor by the shaping of said core,
    tightly sealing the first casting mold shell and the core in the outer circumferential regions thereof,
    mounting a second casting mold shell on the core,
    tightly sealing said second casting mold shell with said core in the outer circumferential regions thereof,
    constructing the second casting mold shell to form a cover located over the flow channels to be formed in the rotor,
    filling cavities formed between the first and second casting mold shells and the core with plastic,
    curing the plastic to form said rotor, and
    finally melting the core away from said rotor to leave said rotor blades and flow channels.

2. A method according to claim 1, and further comprising the step of:
    providing stampings on either side of the reinforcing disk, each of said stampings having height which corresponds to the thickness of the plastic to be subsequently applied.

3. A method according to claim 2, and further comprising the steps of:
    stamping out circular openings and
    deep drawing the opening rims to produce said stampings.

4. A method according to claim 2, and further comprising the steps of:
    stamping out and bending tongues to produce said stampings.

5. A method according to claim 1, and further comprising the step of:
    widening the free end of the hub.

6. A method according to claim 1, and further comprising the steps of:
    providing the reinforcing disk with at least one adjusting opening and
    passing an adjusting mandrel arranged in one of the core and the first casting mold shell through said at least one adjusting opening.

7. A method according to claim 1, and further comprising the steps of:
    mounting a metal hub ring on the hub prior to filling cavities formed between the first and second casting mold shells and core with plastic and
    casting the metal hub ring in the plastic.

8. A method according to claim 1, and further comprising the step of:
    providing the reinforcing disk with a plurality of openings permitting a penetration of the plastic.

9. A method according to claim 1, and further comprising the step of:
    staggering flow channel openings in the circumferential direction of the rotor.

10. A method according to claim 1, and further comprising the step of:
    mounting the hub on a shaft during casting.

11. A method according to claim 10, and further comprising the steps of:
    extending the shaft up to the hub and
    inserting a pin in the latter.

12. A method according to claim 1, and further comprising the step of:
    shaping spacers from core material on the core.

13. A method according to claim 1, and further comprising the step of:
    making the core from a low-melting metal.

14. A method according to claim 13, and further comprising the step of:
    making the low-melting metal a bismuth alloy.

* * * * *